(12) United States Patent
Schaller

(10) Patent No.: US 7,390,131 B2
(45) Date of Patent: Jun. 24, 2008

(54) DECOUPLED WEIGHT COMPENSATION SYSTEM FOR A CAMERA BALANCE-DEVICE

(75) Inventor: Curt O. Schaller, Munich (DE)

(73) Assignee: Camera Dynamics GmbH, Eching (DE)

( * ) Notice: Subject to any disclaimer, the term of this patent is extended or adjusted under 35 U.S.C. 154(b) by 58 days.

(21) Appl. No.: 10/489,543

(22) PCT Filed: Sep. 9, 2002

(86) PCT No.: PCT/EP02/10094

§ 371 (c)(1),
(2), (4) Date: Sep. 23, 2004

(87) PCT Pub. No.: WO03/023273

PCT Pub. Date: Mar. 20, 2003

(65) Prior Publication Data
US 2005/0053371 A1   Mar. 10, 2005

(30) Foreign Application Priority Data
Sep. 13, 2001  (DE)  ................ 101 45 197

(51) Int. Cl.
G03B 17/00  (2006.01)
(52) U.S. Cl. .................. 396/421; 396/428; 352/243
(58) Field of Classification Search ......... 396/419–422, 396/428; 352/243; 348/373, 375, 376; 224/908; 294/139; 248/187.1
See application file for complete search history.

(56) References Cited

U.S. PATENT DOCUMENTS

| 4,158,488 A | * | 6/1979 | Gottschalk et al. | 352/243 |
| 4,158,489 A | * | 6/1979 | Gottschalk et al. | 352/243 |
| 4,158,490 A | * | 6/1979 | Gottschalk et al. | 352/243 |
| 4,474,439 A |   | 10/1984 | Brown | 352/243 |
| 4,976,387 A |   | 12/1990 | Spianti | 224/262 |
| 5,579,071 A |   | 11/1996 | Wetzel et al. | 396/428 |
| 5,737,657 A | * | 4/1998 | Paddock et al. | 396/428 |
| 5,752,112 A | * | 5/1998 | Paddock et al. | 396/421 |
| 5,963,749 A | * | 10/1999 | Nicholson | 396/421 |
| 6,293,676 B1 | * | 9/2001 | Holway | 352/243 |
| 6,554,500 B2 | * | 4/2003 | Melitopoulos | 396/428 |

FOREIGN PATENT DOCUMENTS

WO  99/41540  8/1999
WO  02/081962  10/2002

OTHER PUBLICATIONS

Japanese Examination Report dated Aug. 28, 2007 with English Translation thereof.

* cited by examiner

Primary Examiner—W. B. Perkey
Assistant Examiner—Rishi Suthar
(74) Attorney, Agent, or Firm—Dillworth & Barrese, LLP

(57) ABSTRACT

A camera balance device (1) having a cardanically suspendable pendulum arm (5) which is at least partially straight and whereon a camera fixing device (7) is provided on one side of the cardanic suspension (3) and a modifiable fixing device (15) for counterweights is provided on the other side of the cardanic suspension (3). At least two independently movable fixing devices (17, 19) are provided.

23 Claims, 6 Drawing Sheets

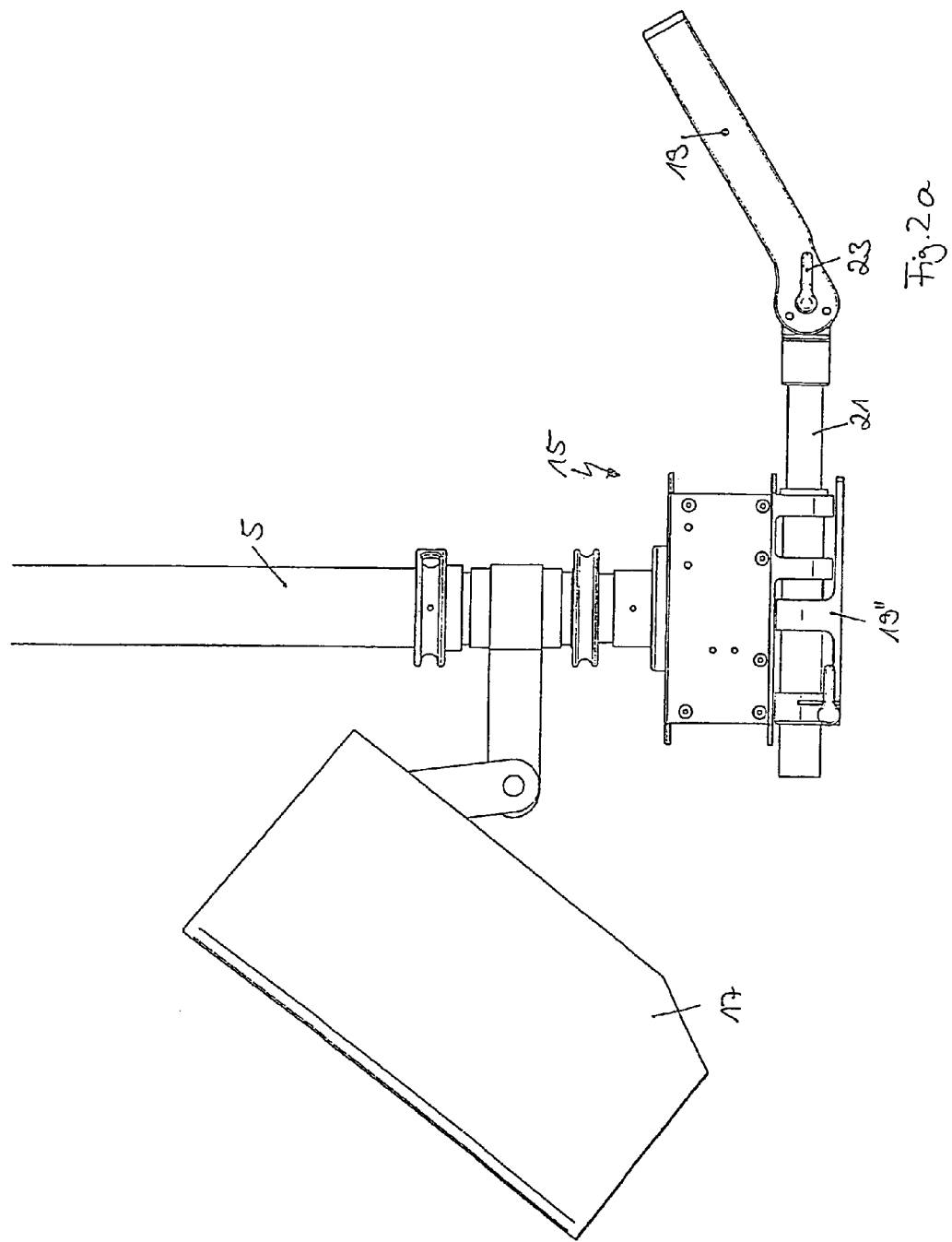

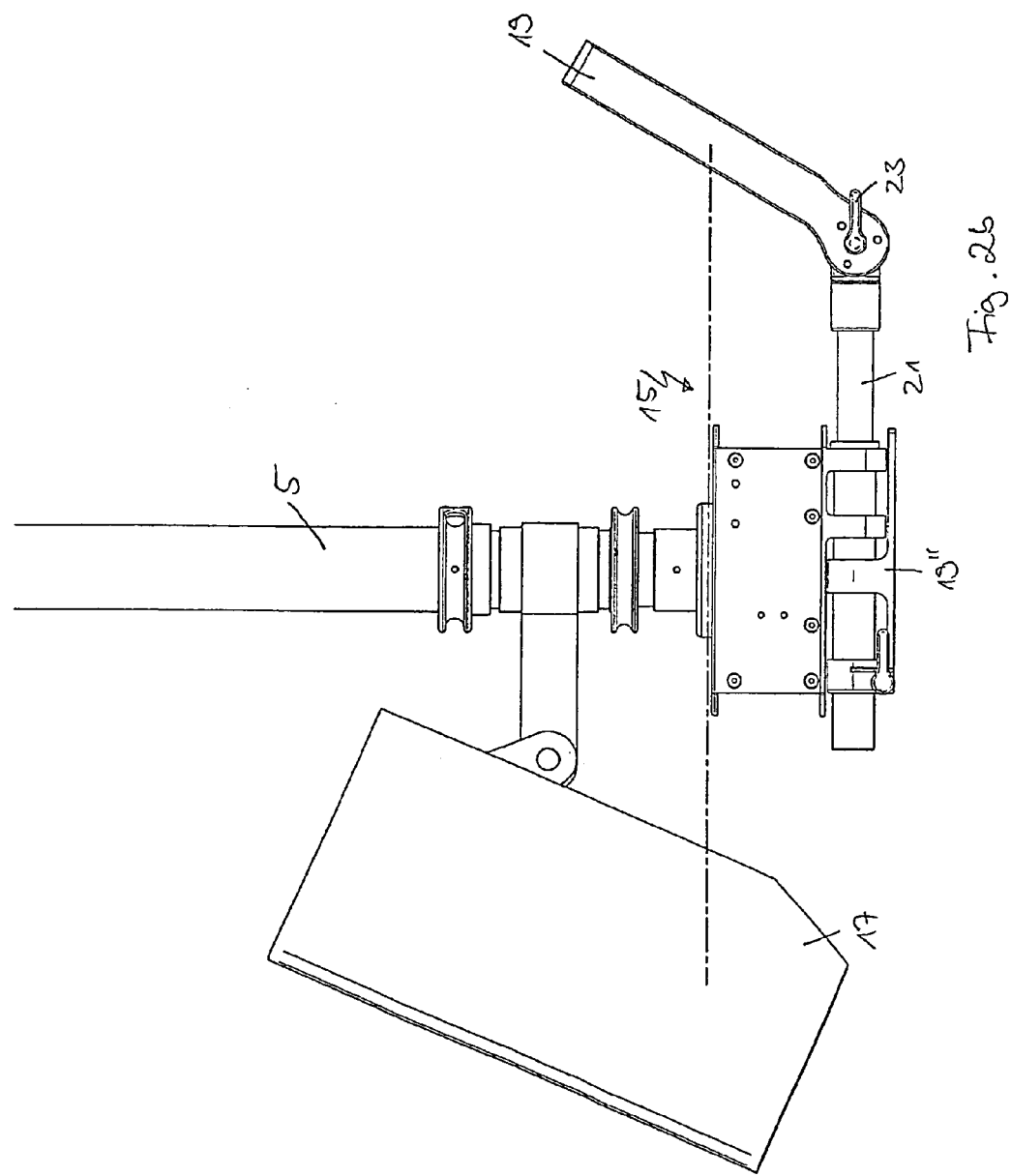

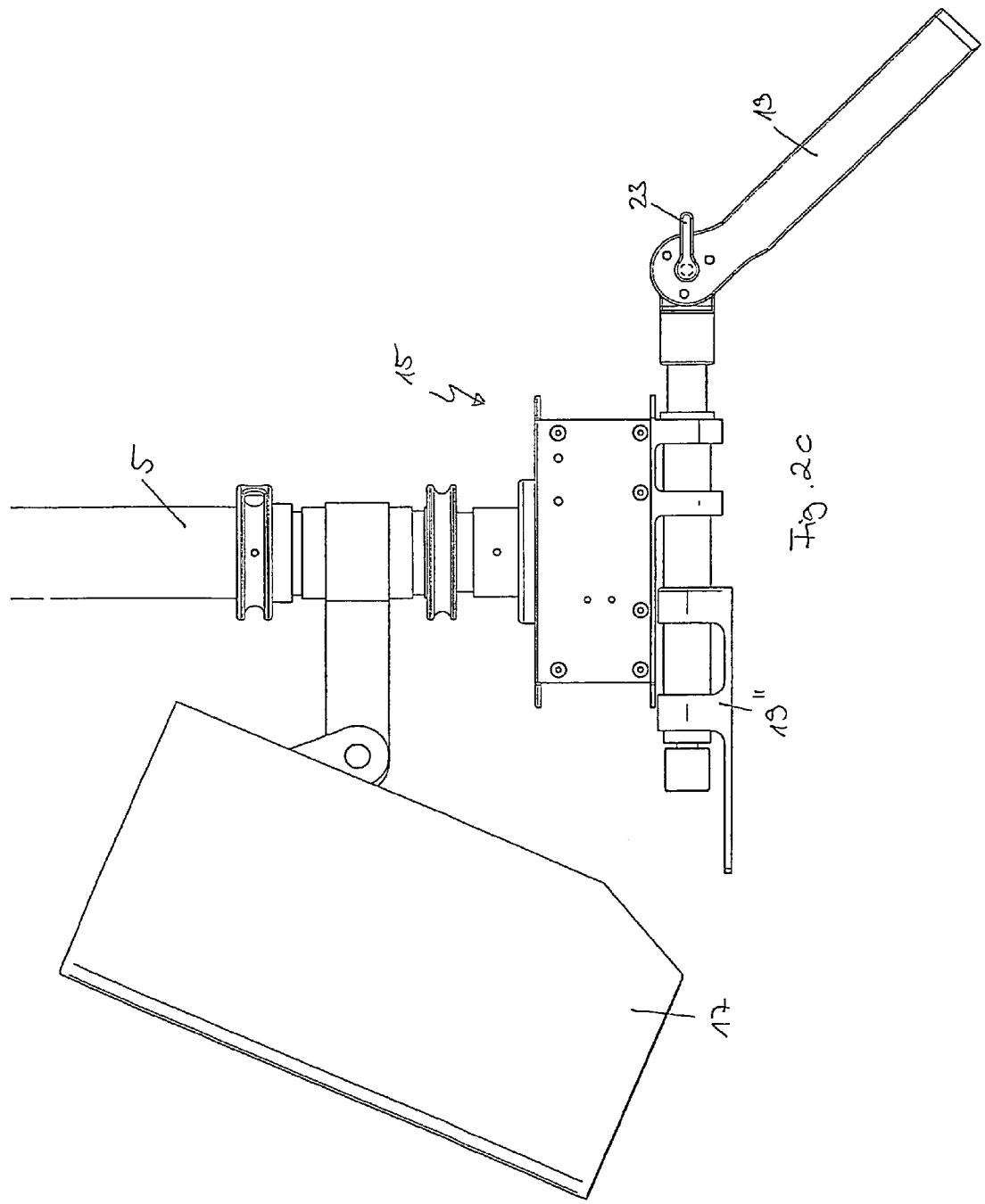

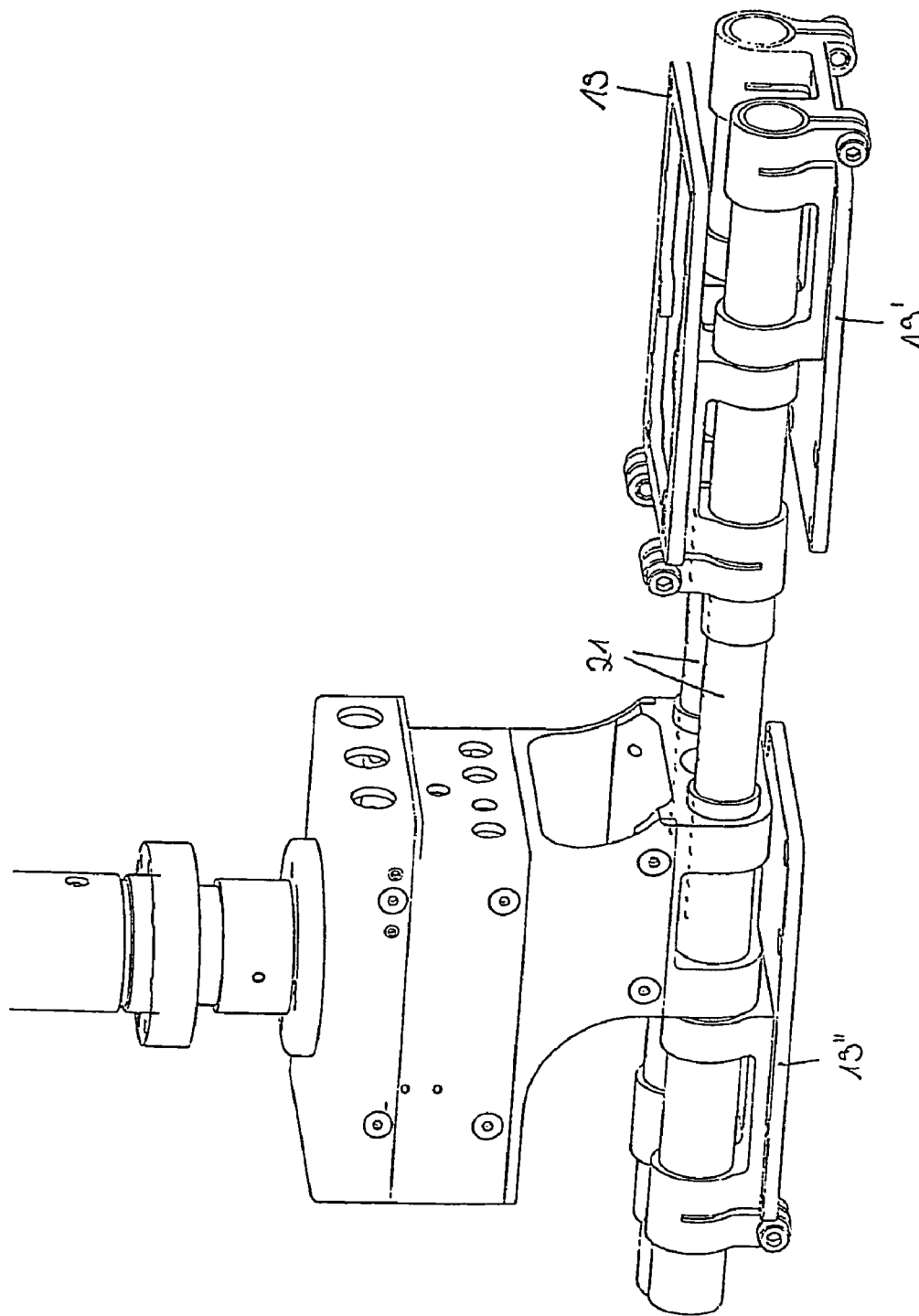

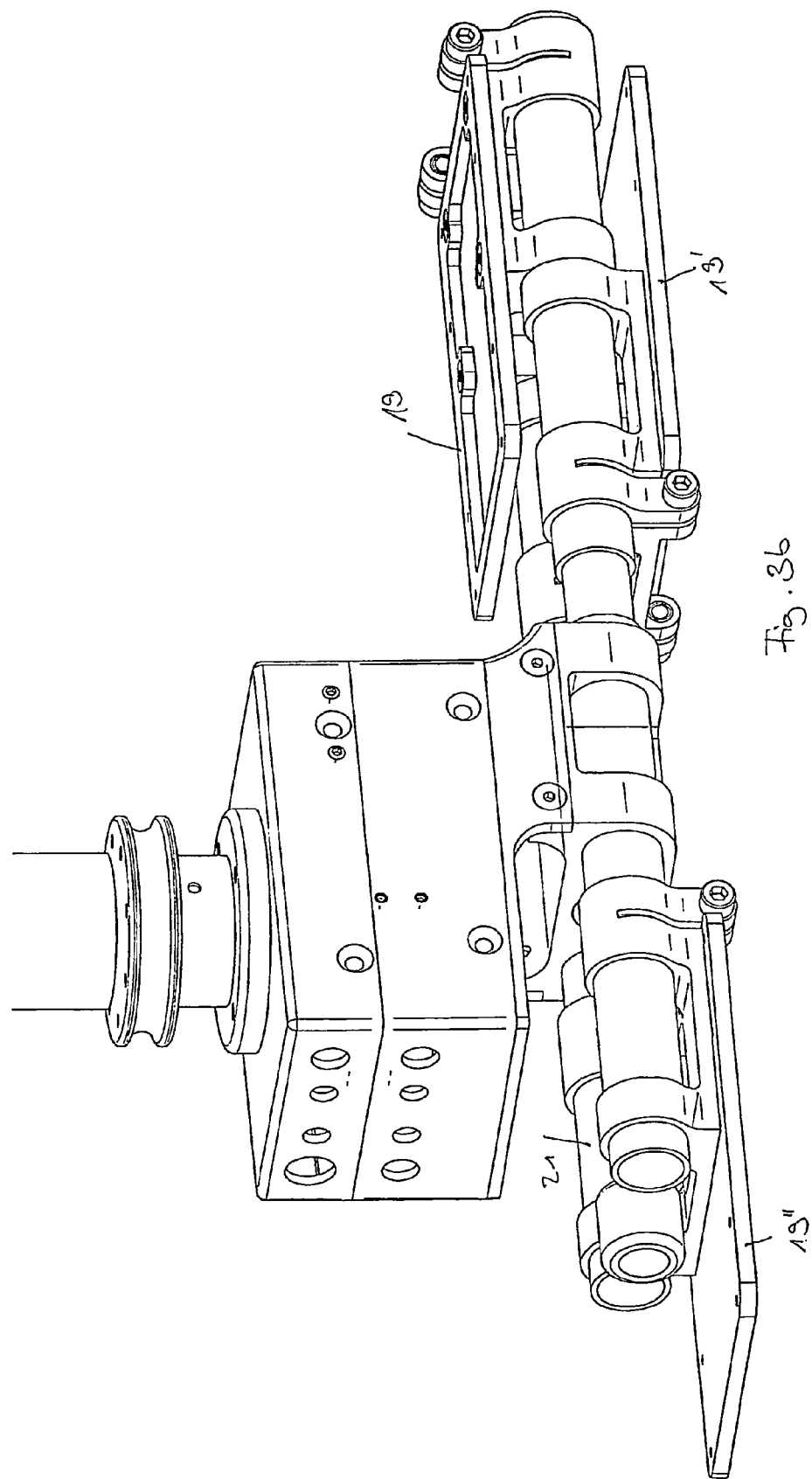

DECOUPLED WEIGHT COMPENSATION SYSTEM FOR A CAMERA BALANCE-DEVICE

BACKGROUND OF THE INVENTION

1. Technical Field

The present invention relates to a camera balance device;

Camera balance devices of this kind are used to balance video and film cameras which are guided manually by a camera operator and are connected by means of a suspension device, for example, to a spring arm in a waistcoat-type carrying device (so-called body support) which is in turn attached to the body of the camera operator.

The suspension device is intended to prevent tilting and inclined movements, oscillations and stepping movements from the body of the camera operator being transmitted to the camera because it is necessary to guarantee a constant camera alignment at all times and avoid any tilting, inclination or oscillation of the camera. Alternatively, the camera may also be secured by means of the suspension device to a free-standing support, dolly, crane etc, whereby the suspension device is then able to prevent any unevenness of the ground exerting an influence on the position of the camera.

For this, the suspension device is designed so that the construction comprising camera and balance device is able to execute a pendulum motion relative to the support. In addition, this construction is connected to counterweights. With a suitable choice and positioning of these counterweights, the camera is balanced in such a way that tilting and inclination movements, oscillations and stepping movements are not transmitted from the body support, free-standing support, dolly or crane to the camera.

2. Prior Art

A known camera balance device comprises a cardanically suspendable pendulum arm which is at least partially straight and whereon a camera fixing device is provided on one side of the cardanic suspension and a modifiable fixing device for counterweights is provided on the other side of the cardanic suspension. Used as counterweights are, for example, batteries which simultaneously function as energy stores.

The cardanic suspension device may in turn be attached, for example, to a spring arm in a body support, a support, dolly or crane.

In the known camera balance device, the counterweights may be moved altogether in order to balance the entire system comprising camera construction, pendulum arm and counterweights in accordance with the conditions in question, for example in accordance with the weight and location of the center of gravity of the camera used.

U.S. Pat. No. 4,474,439 describes a camera balance device of this kind, whereby a monitor, a battery and other electronic components are used as counterweights which are partially movable independently of each other on the pendulum arm or swivelable relative to the pendulum arm.

SUMMARY OF THE INVENTION

The object of the present invention consists in the provision of a camera balance device with more versatile balance adjustment.

This object is achieved by a camera balance device described herein;

Hereby, the position of the weights may be changed at different positions and in different planes.

Advantageous developments of the camera balance device according to the invention may be derived herein; and Preferably, the camera fixing device is provided at one end of the pendulum arm and at least one fixing device for counterweights is provided at the other end of the pendulum arm.

In a particularly advantageous embodiment of the camera balance device according to the invention, a fixing device for a monitor is provided on the pendulum arm. This fixing device for the monitor may be provided on the side of the cardanic suspension on which there is also at least one fixing device for counterweights. Similarly, the fixing device for a monitor may be located on the side of the cardanic suspension on which the camera fixing device is also provided and a fixing device for counterweights can be provided on the other side of the cardanic suspension.

Hereby, a fixing device for counterweights can be provided directly on the fixing device for the monitor. This makes it in particular possible to attach different monitors and still have good balancing options available. Frequently, heavy-tube monitors are used, although these are very expensive. The embodiment according to the invention now also enables the use of light (flat) monitors without losing the possibility of balancing the system completely perfectly. This is in particular possible if counterweights can be attached at different positions and moved, for example in the form of batteries, monitors or other camera accessories.

The sliding elements may, for example, be sliding tubes or also sliding profiles, for example square profiles.

At least one of the backing plates may be attached to the sliding elements in at least two orientations, ie for example in a first orientation and in a second orientation in which it is turned 180° relative to the first orientation. In a preferred embodiment, these backing plates then have an asymmetrical extension so that depending upon the orientation, the location of the center of gravity of a counterweight attached to the backing plate is changed relative to the longitudinal axis of the pendulum arm.

The sliding elements may form a fixed angle, for example a right angle, with the pendulum arm or also be mounted swivelably, in particular steplessly swivelably, and lockably in relation to the pendulum arm.

At least one of the backing plates may be arranged so it may be swiveled relative to the sliding tubes so that the backing plates and hence the counterweights may be swiveled thereby offering further possible variations for the balance setting. In particular, this makes it possible to swivel a backing plate in such a way that it serves as a virtual elongation of the pendulum arm. Alternatively or additionally, at least one of the backing plates may also be mounted swivelably relative to another one so that, for example, it is possible to provide one backing plate that is only movable in relation to the sliding element and to mount a second backing plate swivelably on this first backing plate.

In an advantageous further development of the invention, at least two of the fixing devices for counterweights are embodied identically. For example, in the embodiment with backing plates, each backing plate may be optionally attached to one of sliding elements provided or removed therefrom; due to the identical embodiment of the fixing devices, the counterweights may be attached in an interchangeable way to all identical fixing devices.

The counterweights may, for example, be attached by means of a clamp or clip connection to the fixing devices or the backing plates. However, also conceivable is any other type of detachable fixing means.

Finally, at least two of the fixing devices for monitors, counterweights etc. may be designed to be swivelable and/or moveable so that the centers of gravity of the monitors and counterweights (batteries or similar) attached thereto may be arranged at the same height as the pendulum arm. This minimizes the unbalance caused by the counterweights and monitors.

BRIEF DESCRIPTION OF THE DRAWINGS

The invention will now be described in more detail with reference to the examples of embodiments.

Here:

FIG. 2a-c is a detailed view of the fixing devices for counterweights according to the invention, and FIG. 3a, b is a detailed view of a second embodiment of the fixing devices for counterweights according to the invention.

DETAILED DESCRIPTION OF PREFERRED EMBODIMENTS

Figure 1:
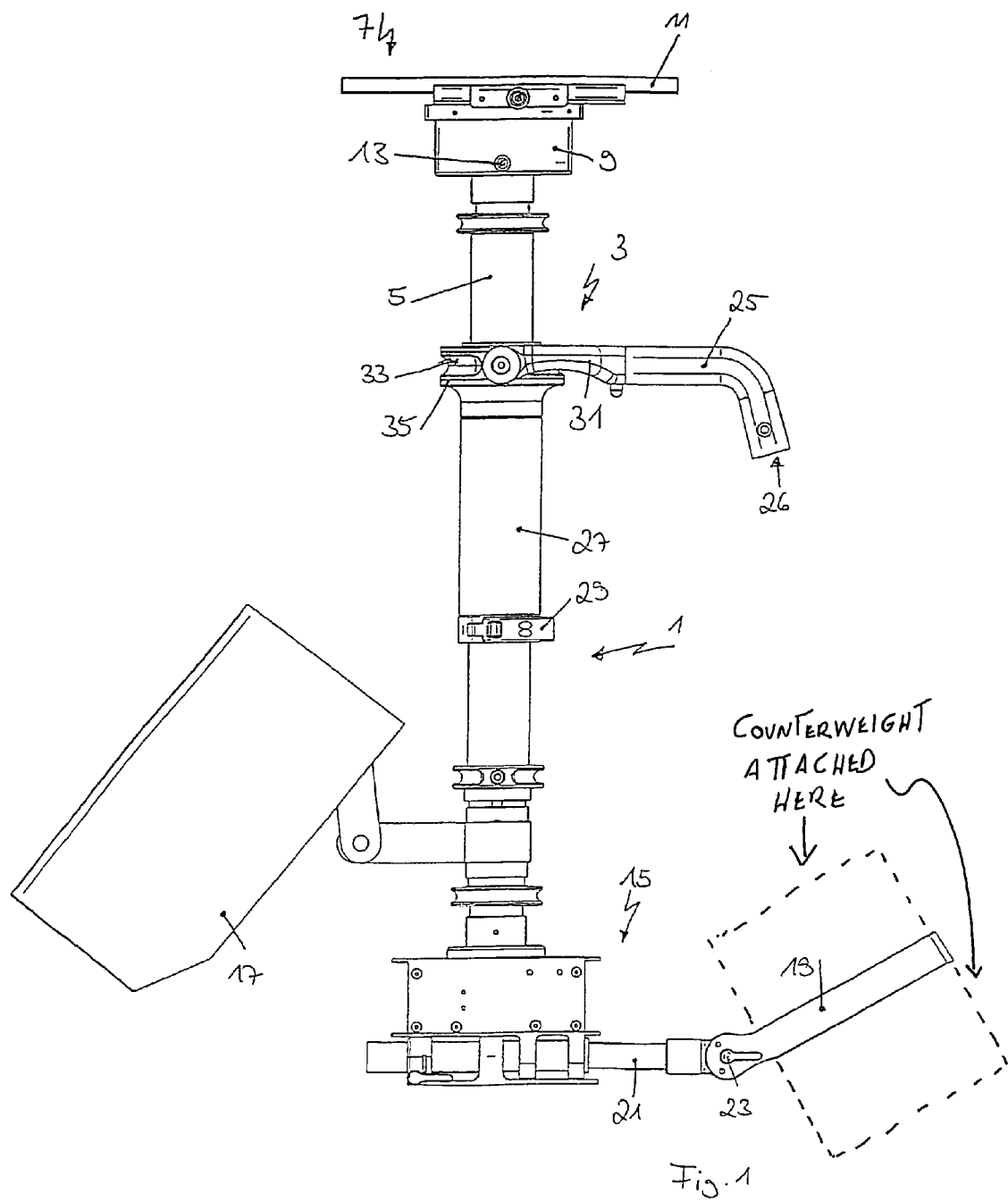
FIG. 1 is a general view of a camera balance system together with a cardanic suspension device and two fixing devices for balancing weights according to the invention.

FIG. 1 shows a camera balance device 1 together with a cardanic suspension device 3 and a holding device 15 for counterweights with two fixing devices 17, 19.

The camera balance device comprises a pendulum arm in the form of a pendulum tube 5. At the upper end of the pendulum tube 5, there is a camera fixing device 7 which substantially comprises a base 9 and a holding plate 11 to which the camera may be attached, whereby the holding plate 11 may be moved relative to the base 9 by means of adjustable screws 13 (only one of which is visible here) and to be precise into the plane of projection in FIG. 1 or out of this plane. Other adjustable screws (not shown) are provided in order to move the holding plate 11 in FIG. 1 to the right and left relative to the base 9. At the lower end of the pendulum tube 5, there is a holding device 15 for counterweights. Provided in this embodiment are a monitor holder 17 and a backing plate 19 for holding counterweights, in the form of batteries, for example. The backing plate 19 is attached to sliding tubes 21 (of which only one is visible) in a movable and fixable manner and in addition may be swiveled in relation to the sliding tube 21; the backing plate 19 is locked in the desired angular position by means of a clamping lever 23.

The construction comprising a pendulum tube 5, camera holding device 7 and holding device 15 for counterweights is cardanically suspended in a suspension device 3. This suspension device 3 comprises a first handle 25 as a joint input fixing element and a second handle 27 as a joint output fixing element. The first handle 25 is used to attach the suspension device to a support, in particular to a spring arm of a body support which is worn by a camera operator. For this, the joint input handle has a drill hole 26 by means of which it may be placed on a pivot in a free-standing support or a spring arm in a waistcoat. The second handle 27 is used to attach the suspension device 3 to the camera balance device 1. For this, the second handle 27 is tube-shaped and arranged around the pendulum tube 5 of the camera balance device 1 in such a way so that it may be moved in relation to the pendulum tube 5. The second handle 27 is locked in relation to the pendulum tube 5 by means of a clamp device 29.

By means of the two handles 25, 27, a camera operator can guide with both hands the construction fixed by means of the first handle 25 for example to a spring arm, a body support, a free-standing stand, dolly or crane.

Three axes of motion are realized in the joint connection between the first handle 25 and the second handle 27: the first handle 25 is connected to a fork element 31 in such a way that it may be rotated relative to this fork element 31 about an axis of rotation corresponding to the longitudinal axis of a straight section of the first handle 25 extending horizontally in FIG. 1. The fork element 31 is in turn connected swivelably about a horizontal joint axis (first cardanic axis) to a joint outer ring 33. This joint outer ring 33 is in turn coupled swivelably about a vertical joint axis (second cardanic axis) to a joint inner ring 35, which in turn is in a fixed connection with the second handle 27, which is attached by the clamp device 29 to the pendulum tube 5 in the camera balance device 1. Hence, the first handle 25, which may be connected to the support, is mounted in relation to the second handle 27 connected to the pendulum tube 5 rotatably about the axis of rotation, swivelably about the horizontal joint axis and rotatably about the vertical joint axis.

The joint suspension device 3 is intended to prevent movements of the support, for example the body support, being transmitted to the camera attached to the holding plate 11. For this, the construction comprising the pendulum tube 5, camera holding device 7 and counterweights must be positioned on the holding device 15 with balance compensation. To achieve this balance compensation in particular also for different camera types with different weights and different locations of the center of gravity, the camera balance device 1 has a plurality of setting options. In particular, the system balance is achieved by the provision of counterweights of varying heaviness on the holding device 15.

FIG. 2a-c shows that, to achieve this, provided in this embodiment are a fixing device 17 for a monitor and two backing plates 19, 19" for counterweights. As already explained above, one backing plate 19 for counterweights is mounted in a swivelable and movable way on sliding tubes 21, only one of which is shown, whereby locking in a desired angular position is achieved by means of the clamping lever 23. Here, the sliding tubes 21 are at right angles to the pendulum arm 5.

The monitor holding device 17 is also mounted in a swivelable and movable way.

FIGS. 2a-c show, to achieve this, three different angular positions of the backing plate 19 and two different positions of the monitor holding device 17. In the position shown in FIG. 2b, the backing plate 19 has been swung a long way upwards, and the monitor holding device has been swung downwards compared to the position shown in FIG. 2a. In this position, the centers of gravity of a monitor attached to the holding device 17 and of a counterweight attached to the backing plate 19 may be at the same height relative to the pendulum rod 5 as indicated by the dashed line in FIG. 2b. In this position, the unbalance created may be minimized. In FIG. 2c on the other hand, the backing plate 19 is swung a long way downwards. In this case, the backing plate 19 contributes to the effective length of the pendulum arm 5. The swivelability of the backing plate 19 enables the pendulum arm 5 to be virtually extended so that it may be possible for the pendulum arm 5 not to be telescopic.

The backing plate 19" can in turn also be pushed onto the sliding tubes 21. Here, the backing plate 19" is asymmetrically extended in such a way that a counterweight substantially attached to the center of the backing plate 19" is located in the fixing position of the backing plate 19" shown in FIG. 2a and 2b directly below the pendulum arm 5. The center of gravity of the counterweight attached to the backing plate 19" is then substantially on the longitudinal axis of the pendulum arm 5.

However, if the backing plate 19" is twisted by 180° when placed on the sliding tubes 21, the extension of the backing plate 19" extends a long way from the pendulum arm 5, as shown in FIG. 2c, and the center of gravity of a counterweight attached thereto is at a distance from the longitudinal axis of the pendulum arm 5. In this case, the counterweight fixed to the backing plate 19'' generates a torque which may be used to compensate reduced weights in other parts of the device. In particular, it is possible, for example, to compensate reduced weight on the backing plate 19 caused by the replacement of a heavy monitor by a light monitor by pushing on the backing plate 19'' in an inverted manner.

The embodiment shown in FIG. 2a-c comprises as a holding device 15 for counterweights the monitor holder 17 and two backing plates 19, 19''; obviously, it is also conceivable to provide further attachment options for counterweights at different points of the pendulum tube 5. Particularly conceivable is the provision of an attachment option for counterweights directly on the monitor holder 17 in order to compensate different monitor weights directly by means of counterweights.

As already mentioned above, the adjustable screws 13 may also be used to move the center of gravity of the camera on the holding plate 11 camera (not shown) relative to the base 9 connected to the pendulum tube 5. An even more flexible system may be obtained if the pendulum tube 5 is telescopic.

FIGS. 3a and 3b show a second embodiment of fixing devices according to the invention. In this embodiment, three backing plates 19, 19', 19'' are provided for the attachment of counterweights. All three backing plates 19, 19', 19'' are of an identical design and mounted movably and fixably on two sliding tubes 21. Due to the identical embodiment of all three-backing plates 19, 19', 19'', the backing plates may be pushed on and removed and interchanged as desired. This is evident from a comparison of the arrangements in FIGS. 3a and 3b: compared to the arrangement FIG. 3a, the backing plate 19'' in FIG. 3b has been twisted by 180° in order to move the center of gravity of a counterweight attached thereto away from the longitudinal axis of the pendulum arm 5 and so achieve the unbalance minimization already described with reference to FIG. 2. In addition, the backing plates 19, 19' in FIG. 3b have also between twisted by 180° compared to FIG. 3a. Although in the instance depicted, this has no influence on the weight ratios, it does elucidate the interchangeability of the backing plates provided 19, 19' and 19''. If three backing plates 19, 19', 19'' are not simultaneously required, they may be dismantled quickly and easily. Counterweights may be fixed to all three backing plates 19, 19', 19'' for example by means of a clip connection.

Once again, in the second embodiment an additional holder for a monitor can be provided corresponding to the holder 17 in FIG. 2.

The invention claimed is:

1. Camera balance device having
    a cardanically suspendable pendulum arm which is at least partially straight and whereon a camera fixing device is provided on one side of the cardanic suspension at least two independently movable fixing devices structured and arranged to support counterweights provided on the other side of the cardanic suspension;
    an independent fixing device for a monitor provided on said pendulum arm;
    at least one sliding element (21) attached to the pendulum arm (5), wherein:
    two of the fixing devices each comprise at least one backing plate (19, 19', 19''),
    at least one of the backing plates is arranged on said at least one sliding element to be translationally slidable to and from a longitudinal axis of the pendulum arm independently from the other backing plates to adjust distance between a counterweight attached to said at least one backing plate and the longitudinal axis of the pendulum arm, and
    another backing plate is pushable onto at least one sliding element such that a counterweight attached to said another backing plate may be located in a first position, in which the counterweight is positioned below the pendulum arm and substantially on the longitudinal axis of the pendulum arm,
    in a second position, in which the counterweight is spaced from the longitudinal axis of the pendulum arm.

2. Camera balance device (1) according to claim 1, wherein the camera fixing device (7) is provided at one end of the pendulum arm (5).

3. Camera balance device (1) according to claim 1, wherein at least one of the fixing devices (19, 19', 19'') for counterweights is provided at one end of the pendulum arm (5).

4. Camera balance device (1) according to claim 1, wherein the camera fixing device (7) and at least one of the fixing devices (19, 19', 19'') for counterweights are provided at opposite ends of the pendulum arm (5).

5. Camera balance device (1) according to claim 1, wherein the fixing device (17) for the monitor and at least one of the fixing devices (19, 19', 19'') for counterweights are provided on different sides of the cardanic suspension (3).

6. Camera balance device (1) according to claim 5, wherein the fixing device (17) for the monitor is provided on the side of the cardanic suspension (3) on which the camera fixing device (7) is also located.

7. Camera balance device (1) according to claim 1, wherein a fixing device for counterweights is also provided on the fixing device (17) for the monitor.

8. Camera balance device (1) according to claim 1, wherein the counterweights are in the form of electrical batteries.

9. Camera balance device (1) according to claim 1, wherein the sliding elements (21) are in the form of sliding tubes.

10. Camera balance device (1) according to claim 1, wherein the sliding elements (21) are in the form of profiles, for example square profiles.

11. Camera balance device (1) according to claim 1, wherein the sliding elements (21) are arranged in a fixed angle in relation to the pendulum arm (5).

12. Camera balance device (1) according to claim 11, wherein the sliding elements (21) extend perpendicularly to the pendulum arm (5).

13. Camera balance device (1) according to claim 1, wherein the angle between the backing plate (19) and the pendulum arm (5) is adjustable, in particular steplessly adjustable.

14. Camera balance device (1) according to claim 1, wherein at least two of the fixing devices (19, 19', 19'') provided for counterweights are identical.

15. Camera balance device (1) according to claim 1, wherein the counterweights may be attached by a clamp or clip connection to the fixing devices (19, 19', 19'').

16. Camera balance device (1) according to claim 1, wherein at least two of the fixing devices (19, 19', 19'') are arranged swivelably and/or movably so that the centers of gravity of counterweights or monitors attached thereto may be arranged at the height of the pendulum arm (5).

17. Camera balance device (1) according to claim 2, wherein at least one of the fixing devices (19, 19', 19'') for counterweights is provided at one end of the pendulum arm (5).

18. Camera balance device (1) according to claim 2, wherein the camera fixing device (7) and at least one of the fixing devices (19, 19', 19") for counterweights are provided at opposite ends of the pendulum arm (5).

19. Camera balance device (1) as claimed in claim 1, wherein at least one of the backing plates (19, 19', 19") may be attached in at least two orientations to the sliding elements (21) and is asymmetrically extended so that, depending upon the orientation of the backing plate (19, 19', 19") relative to the sliding elements (21), a different alignment of the counterweights attached to the backing plate (19, 19', 19") in relation to the pendulum arm (5) is achieved.

20. Camera balance device (1) as claimed in claim 1, wherein at least one of the backing plates (19, 19', 19") is mounted swivelably relative to the sliding elements (21) and/or swivelably relative to another of the backing plates (19, 19', 19").

21. Camera balance device (1) as claimed in claim 1, wherein at least one of said sliding elements (21) is mounted upon an end of the pendulum arm (5).

22. Camera balance device (1) as claimed in claim 1, wherein said another backing plate (19") is also mounted to be translationally slidable to and from the longitudinal axis of the pendulum arm (5).

23. Camera balance device (1) according to claim 5, wherein the fixing device (17) for the monitor is provided on the side of the cardanic suspension (3) on which there is at least one of the fixing devices (19, 19', 19") for counterweights.

* * * * *